United States Patent [19]

Weinberger et al.

[11] Patent Number: 5,461,686
[45] Date of Patent: Oct. 24, 1995

[54] METHOD AND DEVICE FOR MEASURING LIGHT SIGNAL ATTENUATION

[75] Inventors: Imanuel Weinberger, Haifa; Ehud Dekel, Nofit; Tuvia Priel, Kiryat Bialik, all of Israel

[73] Assignee: State of Israel, Ministry of Defense, Armament Development Authority, Haifa, Israel

[21] Appl. No.: 65,186

[22] Filed: May 20, 1993

[30]   Foreign Application Priority Data

Jun. 3, 1992 [IL] Israel ......................................... 102091

[51] Int. Cl.⁶ ............................................... G02B 6/26
[52] U.S. Cl. ..................... 385/32; 250/227.16; 356/73.1; 385/13
[58] Field of Search ................................... 385/12, 13, 27, 385/31, 32, 123–126, 140, 147; 356/3, 4, 72, 73.1, 433; 250/227.11, 227.14, 227.15, 227.16, 227.18, 227.23, 227.24

[56]   References Cited

U.S. PATENT DOCUMENTS

| 4,436,995 | 3/1984 | Whitten | 385/32 X |
| 4,633,079 | 12/1986 | Rieger | 250/227.14 |
| 4,659,215 | 4/1987 | Sumida et al. | 356/73.1 |
| 4,714,343 | 12/1987 | Ide | 356/73.1 |
| 4,996,420 | 2/1991 | Redford | 250/227.24 |
| 5,026,142 | 6/1991 | Worrell et al. | 385/125 |

*Primary Examiner*—John D. Lee
*Attorney, Agent, or Firm*—Reising, Ethington, Barnard & Perry

[57]   ABSTRACT

A method for measuring attenuation of light signals passing through an optical fiber and means for effecting such measurements. The attenuation can be measured over varying angles of bend and with light of different wave lengths. The determinations made are of value in the evaluation of effects of bending optical fibers used in telecommunications, with certain sensors and the like.

12 Claims, 4 Drawing Sheets

METHOD AND DEVICE FOR MEASURING LIGHT SIGNAL ATTENUATION

FIELD OF THE INVENTION

A method and device for measuring signal attenuation due to bending of optical fibers at various radii. The invention is of special value for evaluating the effects of the bending of optical fibers used in telecommunications, in certain sensors etc. Stepwise or continuous measurements are made possible, over a wide range of parameters.

BACKGROUND OF THE INVENTION

Optical fibers, and especially single mode fibers, are widely used in telecommunications. These are highly sensitive to microbends of the order of hundreds of microns which may be the result of pressure by grains of contaminants in the fiber coating or due to contractions of the fiber due to temperature changes. The fibers are also sensitive to "macro-bends" of the order of bend radii of some millimeters, which are encountered when an optical fiber is wound on a small diameter support. Such bends occur during the production of a wide variety of products, such as pressure sensors of hydrophones, of gyros, etc. Typical products comprise a plurality of windings on a support of the order of from about 5 to 20 mm diameter. For many other uses other diameters or shapes of bends are used. The sensitivity of fibers to bends is highly variable for different optical fibers, depending amongst others on the construction of the fiber, its profile, geometry, MFD value. the wave-length propagated via the fiber. One known method is based on the winding of a fiber from a large drum onto one having a small diameter, and measuring signal attenuation due to the winding onto the small one. A system for measuring optical attenutation in optical fibers is set out in U.S. Pat. No. 4,996,420 where the bent region is propagated along the fiber and signal attentuation is measured.

SUMMARY OF THE INVENTION

The invention relates to a method of measuring the attenuation of optical signals-propagated via optical fibers, when these are subjected to "macro-bends" the order of radii of a few millimeters, and to means for effecting such measurements. A method and means are described for making such measurements over a range of stepwise, discrete radii, and means are also provided for varying the radius of the bend in a continuous manner.

The devices of the invention make possible the measurement of the influence of even "half bends over 180°," and "quarter-bends of 90°." Practically any radius of bending can be measured, over a desired value of wavelengths of propagated light and light intensities. The devices are simple and inexpensive and also the measurements are simple, rapid and thus inexpensive. One of the advantages is that a small length of fiber is adequate for such evaluations. According to one embodiment of the invention there is used a device comprising a female member of a given angle (of say 90° or 180°, provided with stepwise grooves adapted to hold in place an optical fiber at a given radius, and a fitting male part complementing the female one.

According to another embodiment, there is provided a device where a bend of desired radius is imparted to an optical fiber by means of a round rod having the desired diameter.

Yet according to a further embodiment, a vise-like structure is provided, where the bent fiber is held between two members the distance between which can be varied at will, thus imparting to the fiber a desired degree of bend.

BRIEF DESCRIPTION OF THE DRAWINGS

The invention is described by way of illustration only with reference to the enclosed schematical drawings, which are not according to scale and in which:

As shown in FIGS. 1, 1a and 1b, a device for measuring the signal attenuation in a given optical fiber at various radii of bending comprises a support 11, to which there is rigidly attached the block 12, with the chuck 13, provided with a groove 14, and a movable support member 15, to which there is attached another chuck 16, aligned with 13, provided with groove 17, the arrangement being such that an optical fiber 18 can be held in the grooves 14 and 17, and the distance between 12 and 16 can be changed continuously by means of a micrometer, so that the 180° bend will be at various radii. Light of a given wavelength is introduced at one end of the fiber 18, and the outgoing signal is monitored and signal attenuation is measured over a desired range of radii and wavelengths. Typical bending radii are about 2 to 25 mm.

FIG. 2 illustrates a device for measuring signal attenuation as a function of bending the optical fiber so as to assume a number of discrete radii, where the fiber is held at one of the levels defined by the grooves 21,22,23,24 and 25 in the male member and in the corresponding female member, 27, which provide a tight fit and thus define an exact radius for the bend of 180° at the five discrete radii.

FIG. 3 illustrates a similar female member which can be used with that of FIG. 4, but which defines a bending of the fiber of 90°, The output signal is measured at the various radii and over a range of wavelengths, and thus information is obtained regarding signal attenuation as a function of these.

As shown in FIG. 5, another embodiment of the invention comprises a bent support 51 for fiber 52, made of ferromagnetic material, where the fiber is held in a groove (not shown) by means of magnets 53 and 54. This structure is mounted on grooved plate 55, from which there extend posts 56 and 57, to which there is attached a horizontal plate 58, there being provided a member 59 which can be moved in the vertical direction by means of screw 60, so as to press against the round rod 61, which defines a bending angle of 90° of the fiber 52, and where the radius of the bend is determined by the radius of rod 61. A variety of rods can be used, of various diameters, thus providing for measurements over a range of radii.

FIGS. 6, 7 and 8 define graphs obtained by means of devices of the invention, where:

Figure 1:
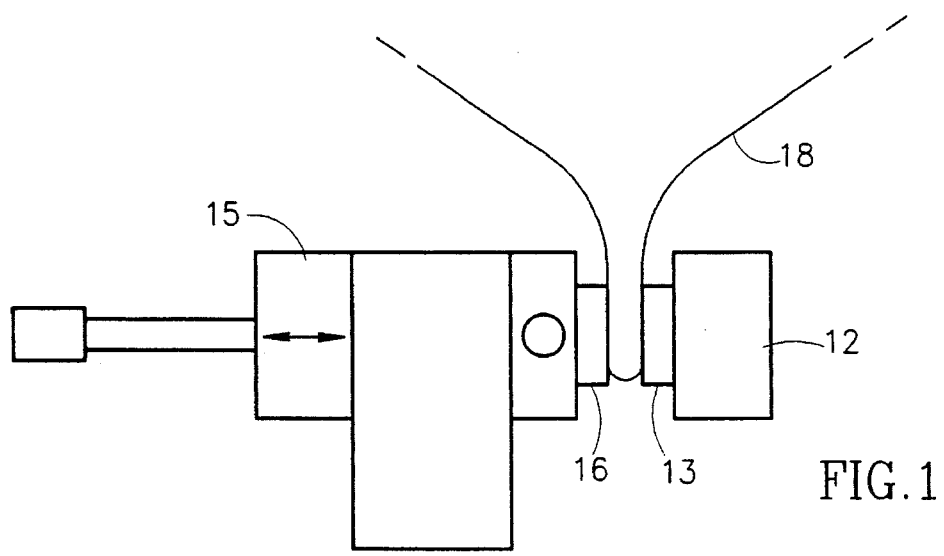
FIG. 1—is a top view of a device for measuring the effects of bending at continuously variable radii.
Figure 1A:
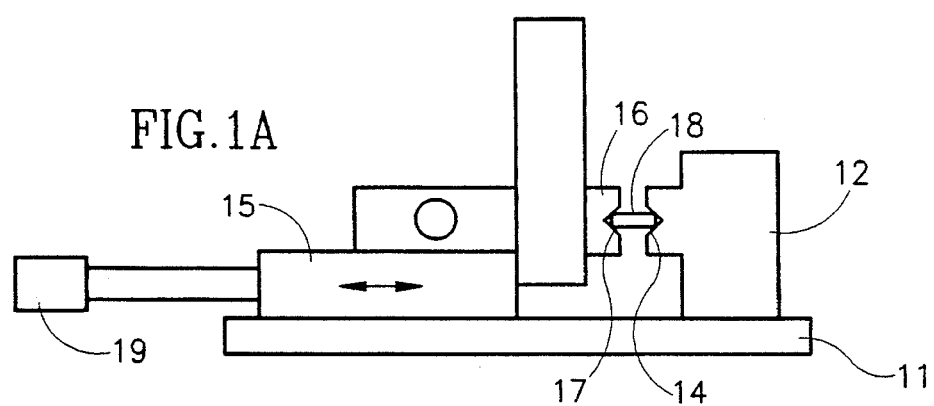
FIG. 1a—is a detailed side-view of this device.
Figure 1B:
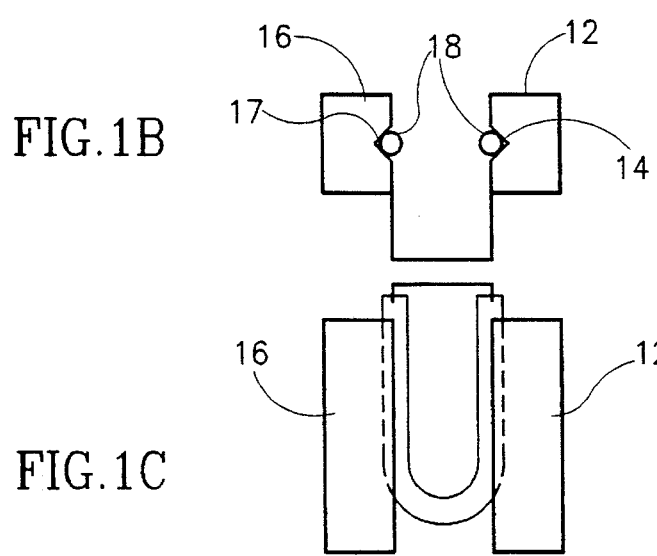
FIG. 1b—is a top view of this device.
Figure 1C:
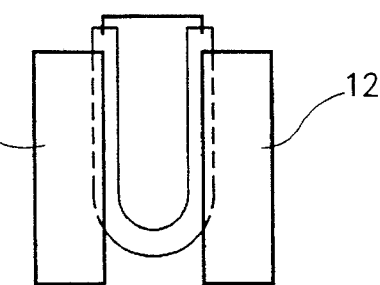
FIG. 1c—is a side-view detailing the vise and the grooves for holding the fiber.
Figure 2:
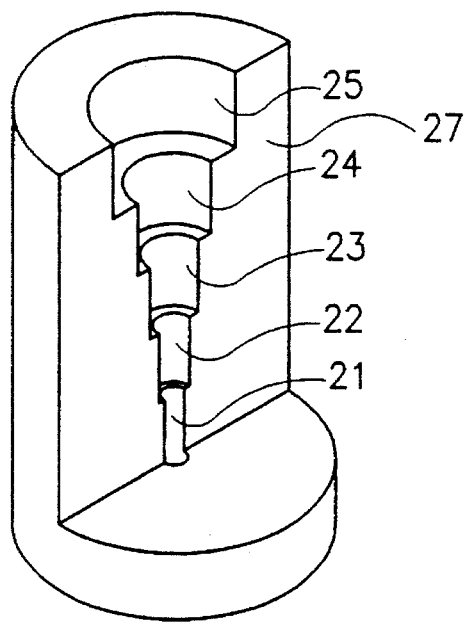
FIG. 2—is a perspective view of a device for determining the effect of bending at 180° with a number of discrete radii.
Figure 3:
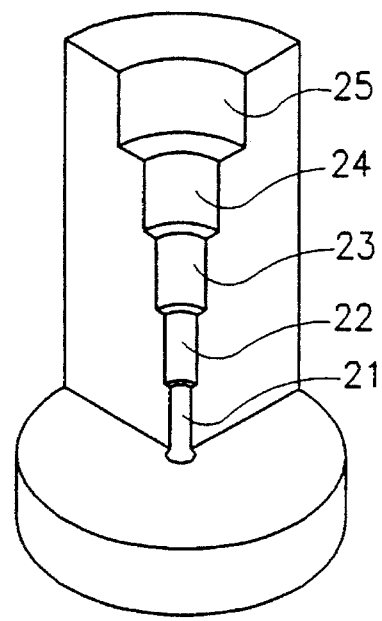
FIG. 3—is a perspective view of a similar device, for measuring bending at 90°.
Figure 4:
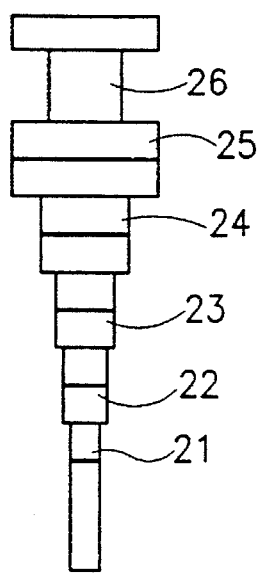
FIG. 4—is a perspective side-view of a male insert fitting the female parts illustrated in FIGS. 2 and 3.
Figure 5:
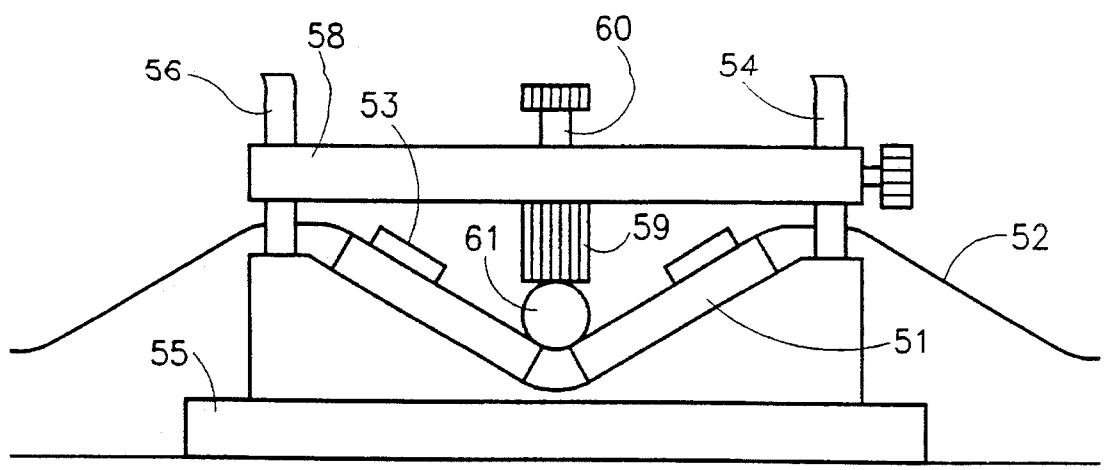
FIG. 5—is a sectional side-view through a device where a bend of 90° is imparted to an optical fiber, the radius of which can be varied stepwise at will, over a range of radii.
Figure 6:
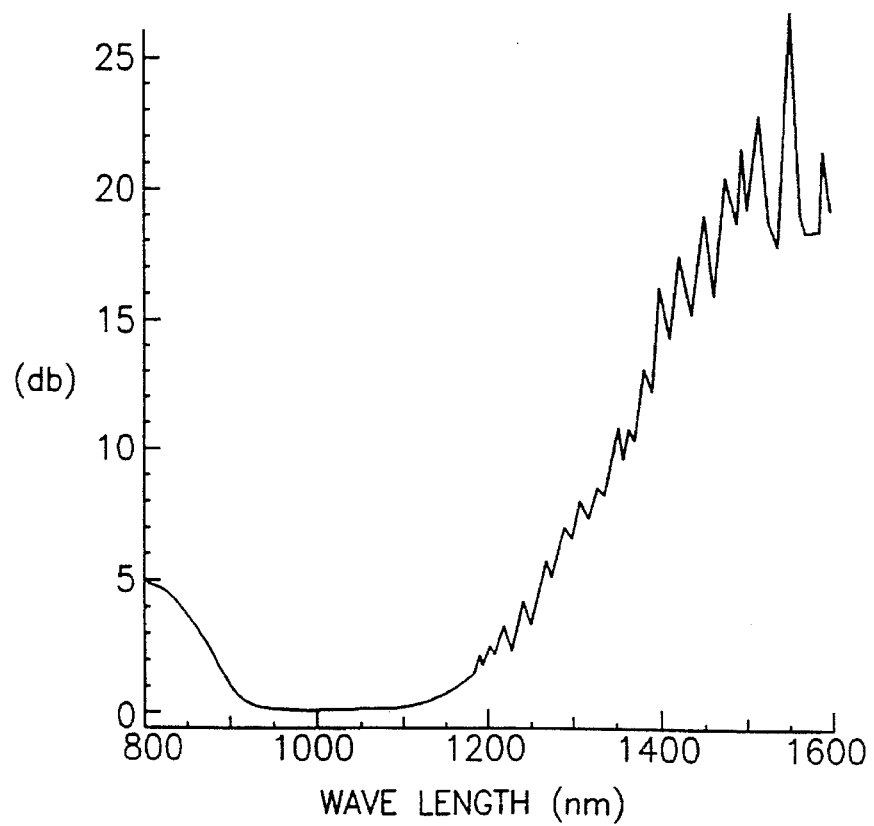
FIG. 6—is a graph of the loss of another type of bent fiber, at various wavelengths.
Figure 7:
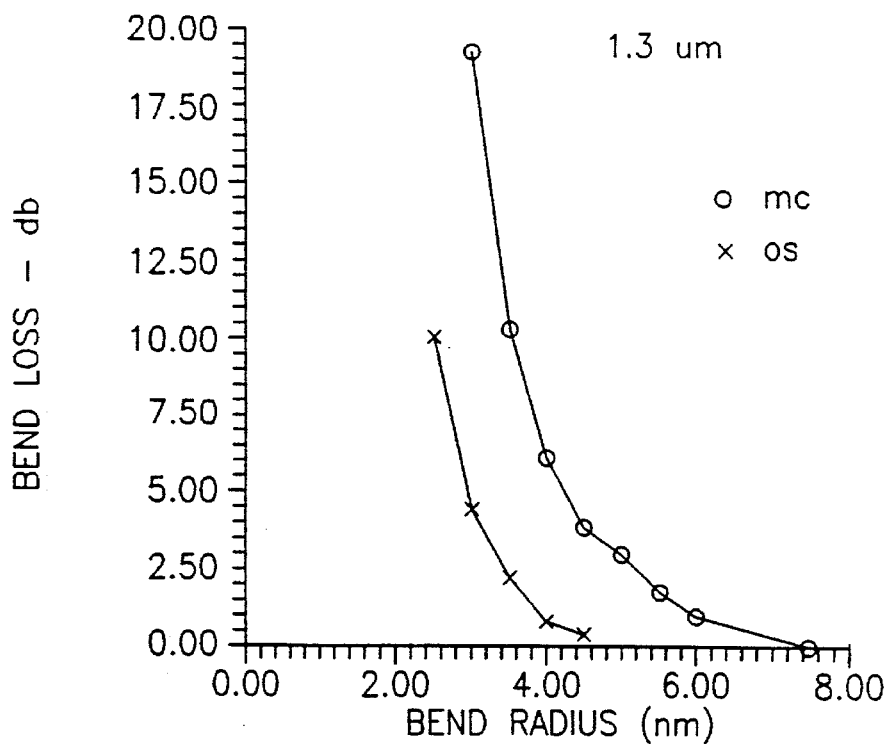
FIG. 7—is a graph illustrating signal attenuation as a function of various bend radii, for 2 types of fiber.
Figure 8:
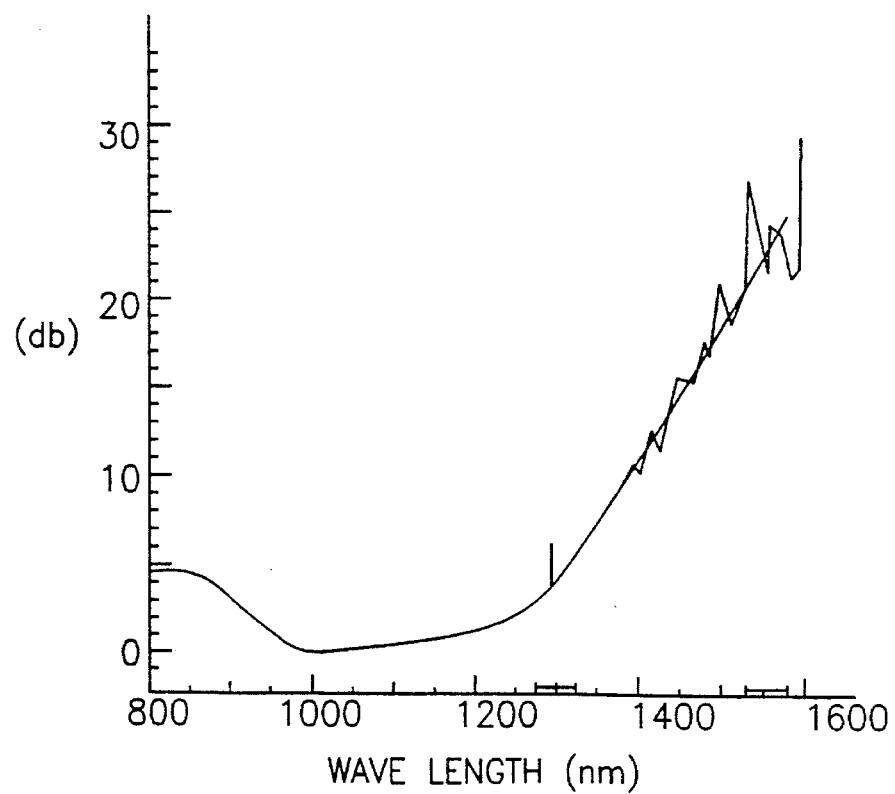
FIG. 8—is a graph of signal attenuation, cleaned of transients, at various wavelengths.

Measurements are generally carried out by inserting a short length of optical fiber (100 to 150 cm) into one of the devices, one of its ends is attached to a suitable light source, such as a laser emitting in a narrow range of wavelengths, and the other end of the fiber is attached to a photosensor. A light source having a wide spectrum can be used advantageously, with suitable filters. This makes possible the evaluation of signal attenuation at various wavelengths. Generally there exists a strong dependency on the wavelengths used. Generally, transients appear, which are advantageously filtered out. Such transients can be filtered out by using an Index Matching Fluid, after removing the plastic cover of the fiber close to the sensor, or by other means. After measuring the signal via the bent fiber, the measurement is repeated with the same fiber, but without the bend. The ratio, on a logarithmic scale, gives the attenuation due to bending in DBs (decibels).

Measurements can be carried out with a variety of optical fiber types. Good results were obtained with single mode fibers, such as SMF-28 of Corning. Generally, the diameter of the bend will be in the 3 to 50 mm range, but it is possible to measure at other diameters. At smaller ones than 2 mm, the fiber is apt to break. The results indicate a rather high signal attenuation for bends at certain wavelengths at small radii of bending.

We claim:

1. A method for measuring the sensitivity to bend of an optical fiber by measuring attenuation of light signals passed via such fiber, which comprises bending a short length of an optical fiber to define a bend which varies in a substantially continuous manner within a range of bend-radii and over a range of bend-angles, passing a light signal through the fiber in the bent condition and a straight condition wherein the fiber is without any bends, and comparing the intensity of the signals received at the output of the fiber during its continuous bending with that passed through the straight fiber.

2. A method according to claim 1, where the radius is changed in the range of bend from 2 mm radius to 50 mm radius, and the attenuation is measured as a function of the change of such radius.

3. A method according to claim 1 where light having various wavelengths is passed one after the other through the bent and straight fiber, and the signal attenuation is measured as a function of angle and radius of tile bend, and of light wavelength.

4. A method according to claim 1, where the fiber is given a bend over a given scale of radii in an essentially continuous manner, defining a range of predetermined angles of such bend, and measurements are carried out over said range of radii in the 2 mm to 25 mm radius range, and an angle of from 30° to 180°.

5. A method according to claim 1, where the source of the light signal is a laser or a lamp giving a wide spectrum, which light source is used with a light filter wide pass-band spectral filter, of desired wavelength range.

6. A method according to claim 1 where transients appearing in a graph of attenuation as function of the wavelength depicting the measurements are filtered out.

7. A method according to claim 1 where a length of fiber of from 50 to 150 cm is used for the measurement.

8. A device for measuring signal attenuations of light signals passing through a bent optical fiber, which comprises means for bending a short length of such fiber in an essentially continuous manner over a range of angles, so as to obtain a bend in the 2 mm radius to about 25 mm radius range, means for passing a light signal through such fiber as it is bent, means for passing a light signal through a straight fiber, and means for comparing the signals thus obtained.

9. A device according to claim 8 comprising means for passing light of different wavelengths through the optical fiber.

10. A device according to claim 8, wherein said means for passing a light signal includes a laser.

11. A device according to claim 8 where there is provided a light source having a wide spectral range, and filter means for applying at any given time a desired wavelength.

12. A device according to claim 8, comprising means for filtering out transients.

* * * * *